US007172453B2

(12) United States Patent
Skluzacek et al.

(10) Patent No.: US 7,172,453 B2
(45) Date of Patent: Feb. 6, 2007

(54) LOOP PLUG

(75) Inventors: Kenneth Allen Skluzacek, North Mankato, MN (US); M'hamed Anis Khemakhem, Minnetonka, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/342,335

(22) Filed: Jan. 27, 2006

(65) Prior Publication Data

US 2006/0240703 A1 Oct. 26, 2006

Related U.S. Application Data

(60) Provisional application No. 60/648,379, filed on Jan. 27, 2005.

(51) Int. Cl.
*A01R 13/00* (2006.01)

(52) U.S. Cl. .................................... 439/483; 439/488

(58) Field of Classification Search ................ 439/465, 439/906, 701, 687, 696, 731, 484, 483, 160, 439/578

See application file for complete search history.

(56) References Cited

U.S. PATENT DOCUMENTS

| | | | | | |
|---|---|---|---|---|---|
| 1,956,410 | A | * | 4/1934 | Benander | 439/687 |
| 3,381,259 | A | | 4/1968 | Manos | |
| 4,506,889 | A | * | 3/1985 | Lewis | 463/47.4 |
| 4,876,621 | A | * | 10/1989 | Rust et al. | 361/58 |
| 4,913,663 | A | * | 4/1990 | Siemon et al. | 439/509 |
| 5,175,662 | A | * | 12/1992 | DeBalko et al. | 361/119 |
| 5,260,994 | A | * | 11/1993 | Suffi | 379/413.04 |
| 5,730,622 | A | | 3/1998 | Olson | |
| 6,024,604 | A | * | 2/2000 | Chilton et al. | 439/579 |
| 6,101,079 | A | * | 8/2000 | Viklund | 361/119 |
| 6,139,369 | A | | 10/2000 | Arwidi et al. | |
| 2004/0053534 | A1 | | 3/2004 | Beneke et al. | |

FOREIGN PATENT DOCUMENTS

| | | |
|---|---|---|
| AU | 75 772/81 | 4/1982 |
| DE | 1 640 751 | 2/1991 |
| GB | 957032 | 5/1954 |

(Continued)

OTHER PUBLICATIONS

Exhibit A: Canford Audio PLC catalog pages, 2002-2003, front cover and pp. 110 and 111, showing various loop plugs.

(Continued)

*Primary Examiner*—Briggitte R. Hammond
(74) *Attorney, Agent, or Firm*—Merchant & Gould P.C.

(57) ABSTRACT

A looping plug for use with coaxial telecommunications jacks to loop the signal between a pair of adjacently mounted jacks. The loop plug includes a molded non-conductive housing which fits about a pair of identical die cast, conductive, inner housing halves. A pair of outer conductive barrels are mounted to and extend from the inner housing. The barrels are spaced apart to accommodate the spacing of the jack pair to be engaged. A continuous center conductor extends between and within the two conductor barrels and is electrically isolated from the barrels. The barrels and the center conductor may be of either gender as required to engage the jack pair.

26 Claims, 22 Drawing Sheets

FOREIGN PATENT DOCUMENTS

| | | | |
|---|---|---|---|
| GB | 1 572 551 | | 7/1980 |
| WO | WO 2004/010717 | A2 | 1/2004 |

OTHER PUBLICATIONS

Exhibit B: Photographs of a Canford MUSA loop plug, (6 pages) (Admitted as prior art as of application filing date).

Exhibit C: Drawings of a Standard loop plug by ADC Telecommunications, Inc., (2 pages) (Admitted as prior art as of application filing date).

Exhibit D: Drawings of a Bantam Audio loop plug by ADC Telecommunications, Inc., (4 pages) (Admitted as prior art as of application filing date).

Exhibit E: Drawings of a Midsize loop plug by ADC Telecommunications, Inc., (1 page) (Admitted as prior art as of application filing date).

* cited by examiner

LOOP PLUG

CROSS REFERENCE TO RELATED APPLICATION

This application claims benefit of provisional application Ser. No. 60/648,379, filed Jan. 27, 2005, the disclosure of which is incorporated by reference.

BACKGROUND

In broadcast communications environments, coaxial communications circuits are often associated with each other to form pairs of circuits, such as a pairing of send and receive circuits. These pairs of circuits may be used to connect signal generating devices, such as cameras, microphones, or other equipment, with signal processing devices, such as mixers, amplifiers, or other equipment. In some installations, a plurality of signal generating devices and a plurality of signal processing devices may be present and a pair of circuits may be extended to each one of these devices. The pairs of circuits from the devices may be directed to a panel or other connection interface, permitting any of the generating devices to be connected to any of the processing devices, as desired or required for a particular operation. At the panel or interface device, these circuits may end in a connector, such as a jack or a plug.

In such installations, at times the circuit pairs of some devices may not be connected to any other devices. In such a case, it may be desirable for the unconnected device to have any signals generated by the device and transmitted over the send circuit looped back through and transmitted back to the device through the receive circuit. Such looping may be accomplished by a cable with a mating plug or jack which is connected to each of the circuits at the panel or interface device. Alternatively, if the pairs of circuits are located directly adjacent to each other at a known spacing and size, a loop plug may be used to connect the circuits, with the loop plug having an appropriate plug or jack to interface with the jack or plug of the circuit.

Improvements to such loop plugs are desirable.

SUMMARY

A loop plug in accordance with the present invention includes a conductive housing including first and second halves which together form a loop back passage through the housing extending between first and second openings on a front face of the housing. A center conductor having a U-shape is positioned in the loop back passage and includes first and second ends extending from the first and second openings, respectively. An insulator extends around at least a portion of the center conductor. First and second conductive barrels are mounted to the housing in conductive contact with the housing. Each of the first and second conductive barrels is mounted around one of the first and second ends of the center conductor, respectively. Each of the first and second conductive barrels extends parallel to each other from the first and second openings of the housing. The insulator separates the center conductor from contact with the first and second conductive barrels. A non-conductive handle is mounted to the housing.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows.

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

Figure 1:
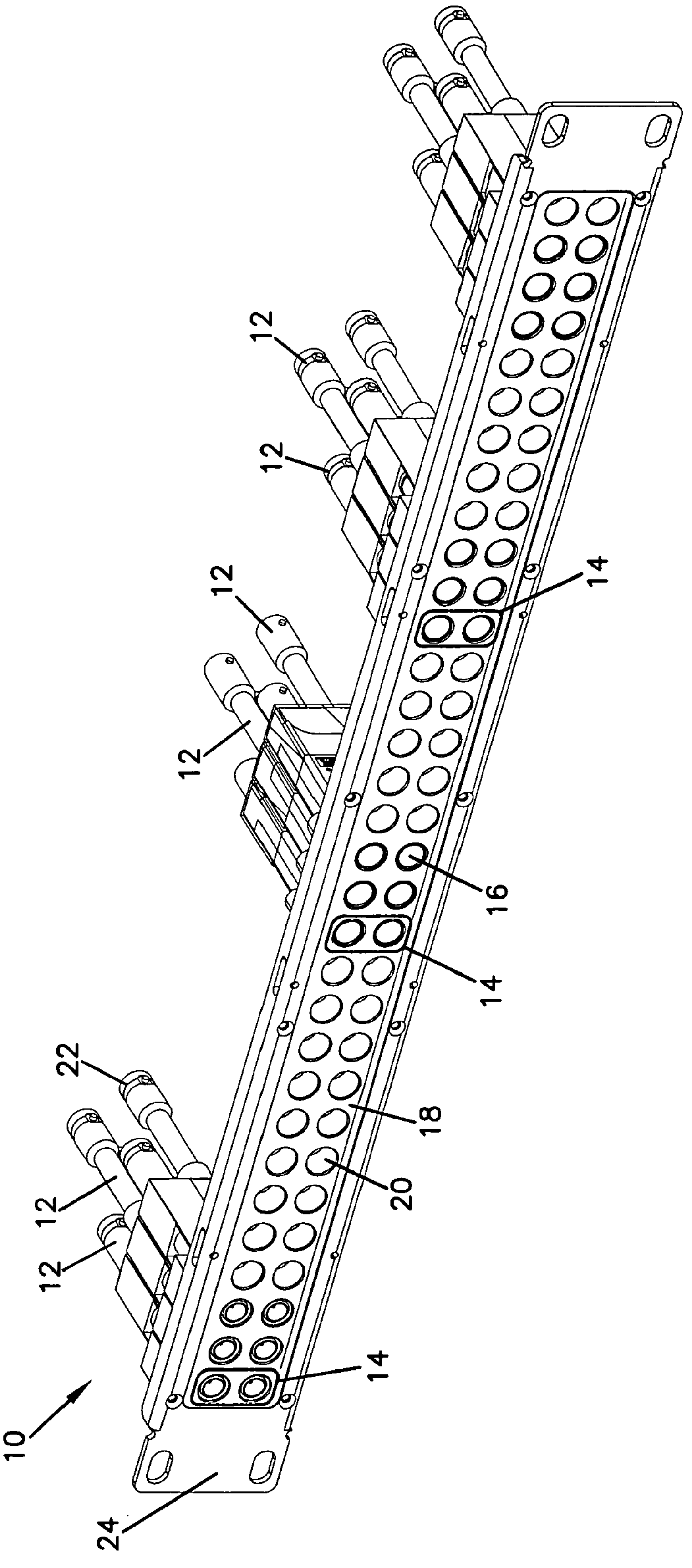
FIG.1 PRIOR ART
FIG. 1 is a perspective view of a prior art coaxial cable connection panel with a plurality of jack pairs accessible through a front face of the panel.
Figure 2:
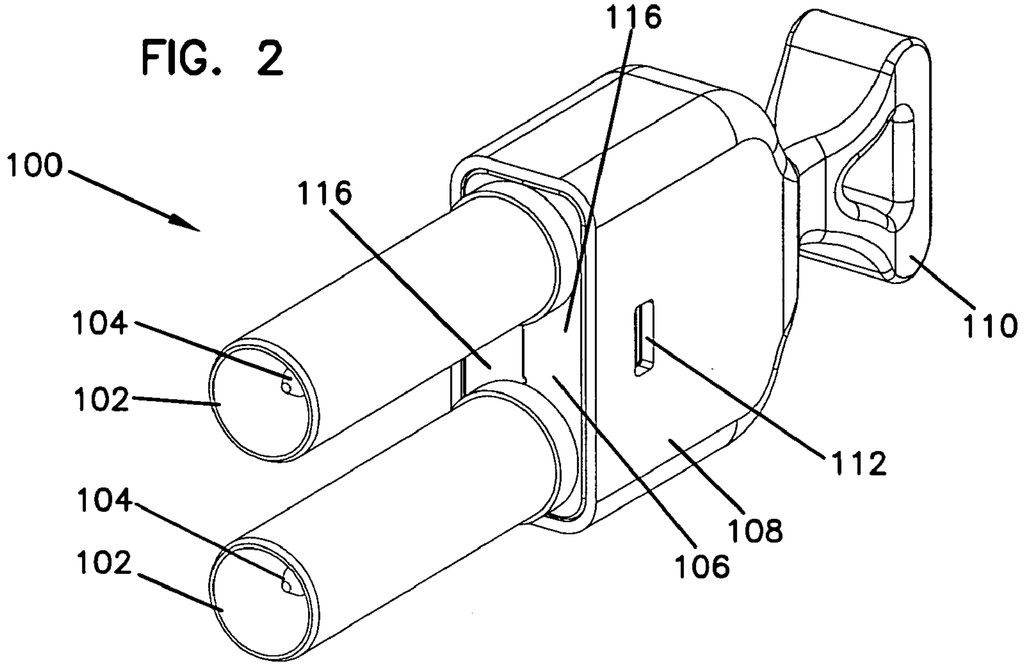
FIG. 2 is a first perspective view of a loop plug for connecting pairs of jacks such as mounted to the connection panel of FIG. 1.
Figure 3:
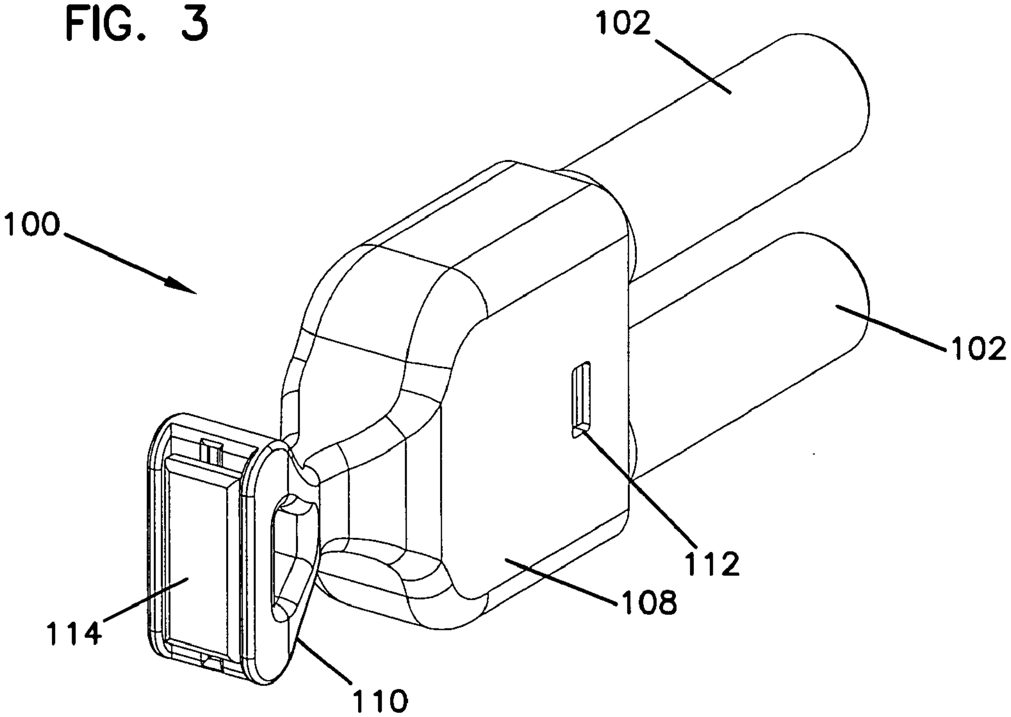
FIG. 3 is a second perspective view of the loop plug of FIG. 2.
Figure 4:
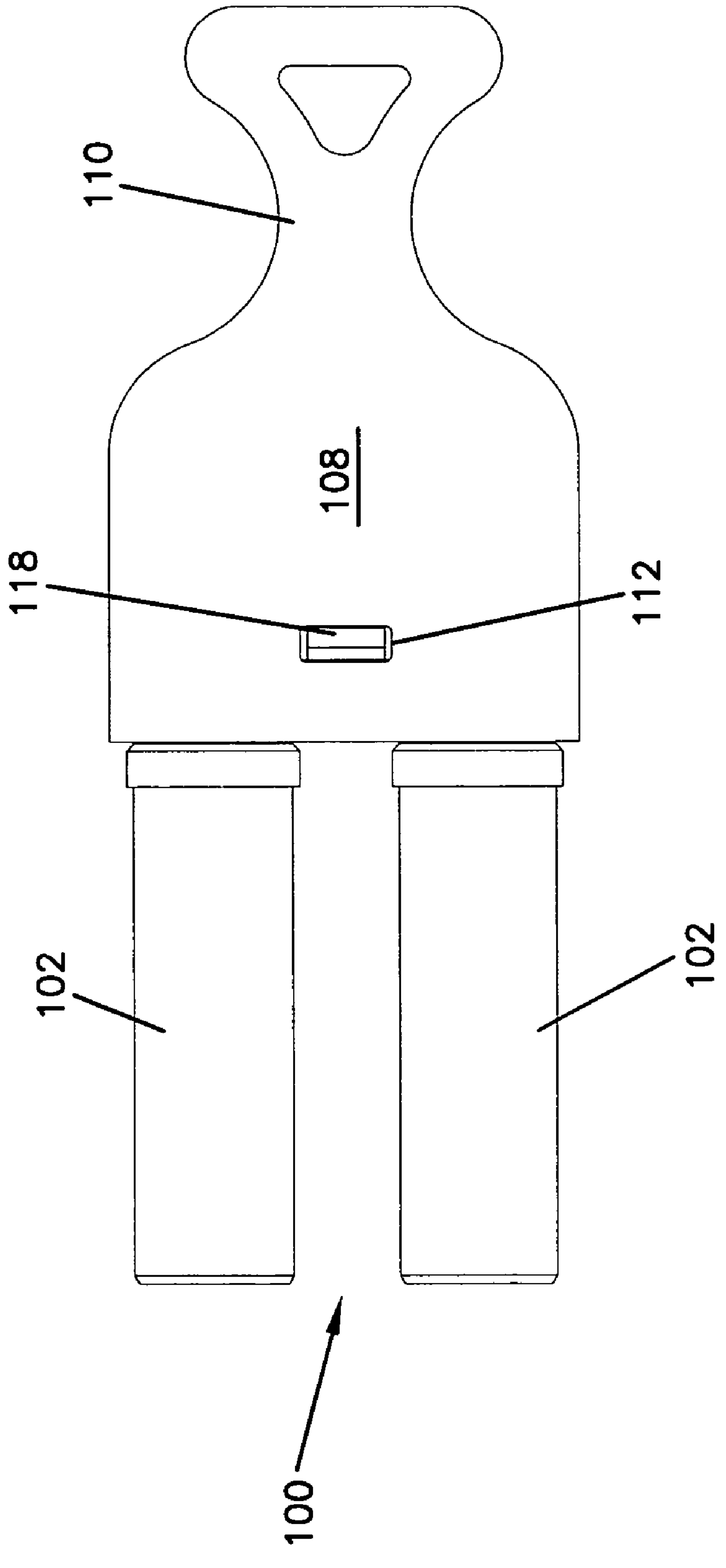
FIG. 4 is a side view of the loop plug of FIG. 2.

In FIG. 1, a panel assembly 10 includes a plurality of jacks 12 arranged in pairs 14. Each jack 12 includes a front end 16 and a rear end 22 for connecting to a extending to or from a device which either generates or processes electrical signals. Front ends 16 are accessible through one of a plurality of openings 20 in a front face 18 mounted within or formed integrally with a panel frame 24.

FIGS. 2 to 19 illustrate three embodiments of a loop plug which may be used to connect the front ends 16 of both jacks 12 of a pair 14. Loop plug 100, shown in FIGS. 2 to 7, includes a pair of conductive barrels 102 within each of which is mounted a center electrical conductor 104. Barrels 102 are spaced apart far enough to mate with front ends 16 through openings 20 and are held at this spacing by mounting within a die cast inner housing 106. Inner housing 106 is made up of a pair of identical pieces or halves 116, which are shown in further detail in the FIGS., below. Inner housing 106 is mounted within an outer housing 108 which also includes a grip portion 110 shaped to provide a secure finger grip for a user. Outer housing 108 includes a opening 112 on each side. Opening 112 receives a tab portion 118 extending from each of the inner halves 116. Included in grip portion 110 is an indicia 114 mounted to be visible to a user standing in front of panel assembly 10.

Figure 6:
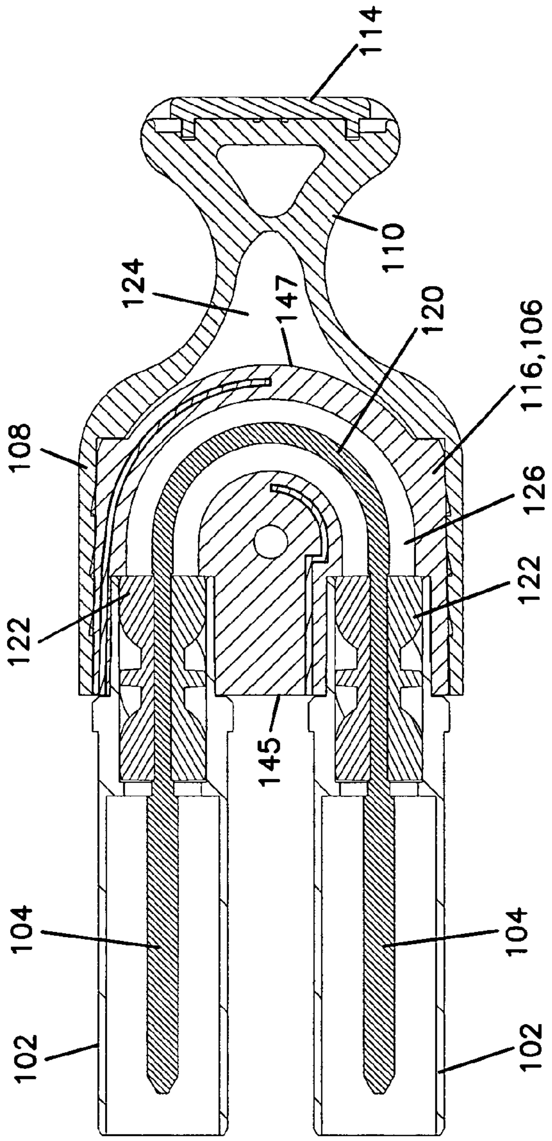
FIG. 6 is a side cross-sectional view of the loop plug of FIG. 2.
Figure 5:
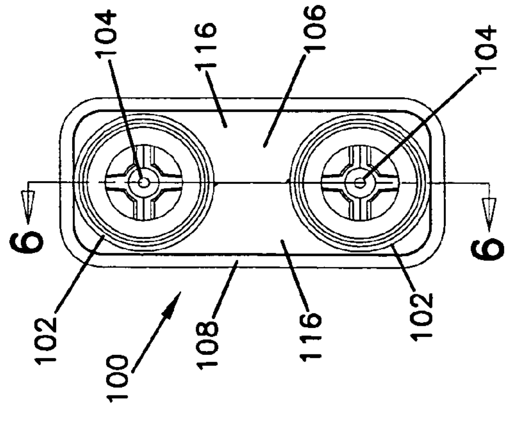
FIG. 5 is an end view of the loop plug of FIG. 2.

Referring now to FIG. 6, center electrical conductors 104 within each of the barrels 102 are opposite ends of a continuous loop conductor 120 extending within an opening 126 defined by the inner housing halves 116. Opening 126 has a U-shape and defines a loop back passage. A pair of insulators 122 position loop conductor 120 within barrels 102 and electrically isolate the barrels from the center conductors. Inner housing 106 is positioned within an opening or pocket 124 defined by outer housing 108.

Figure 7:
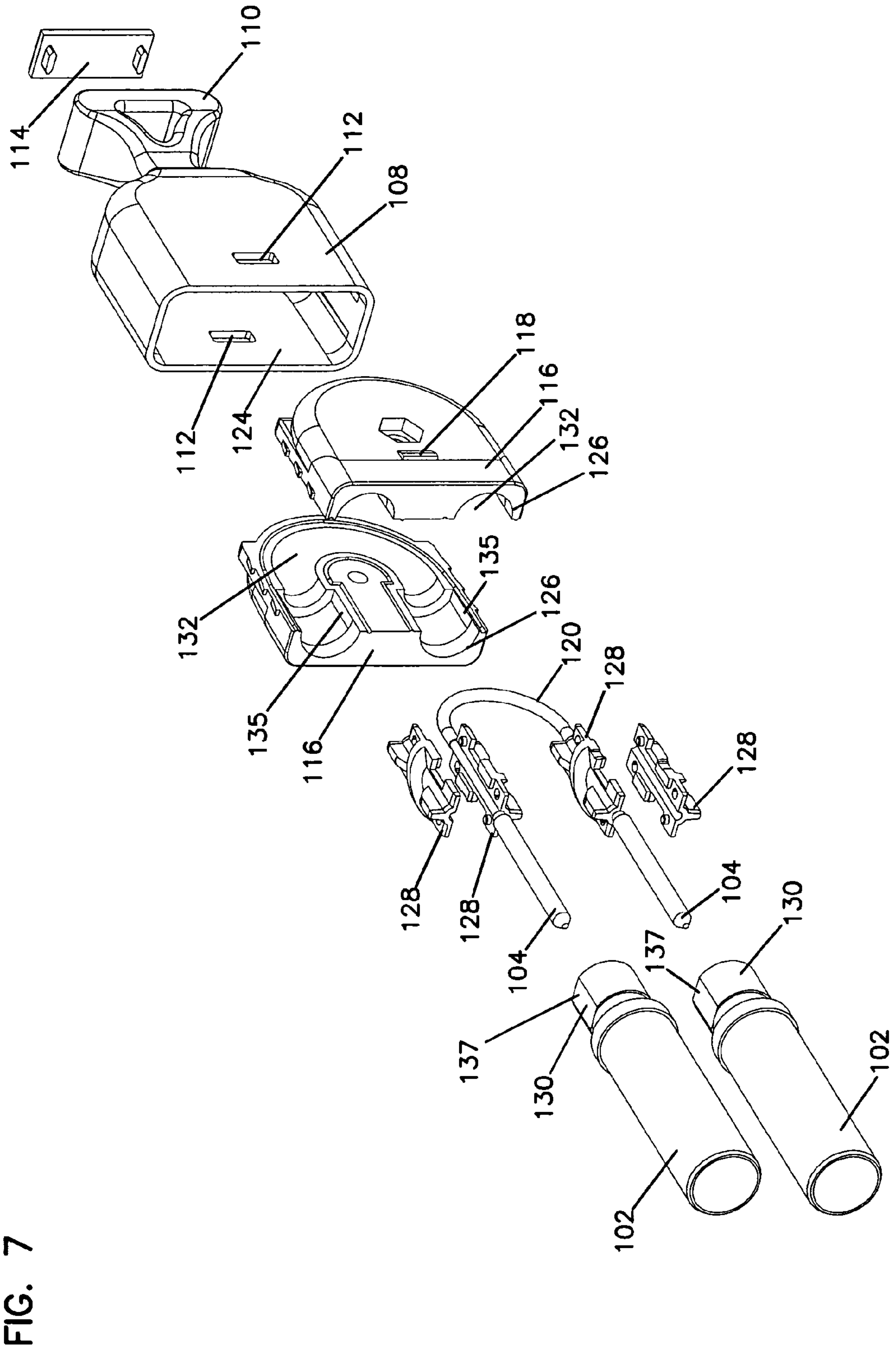
FIG. 7 is an exploded perspective view of the loop plug of FIG. 2.
Figure 8:
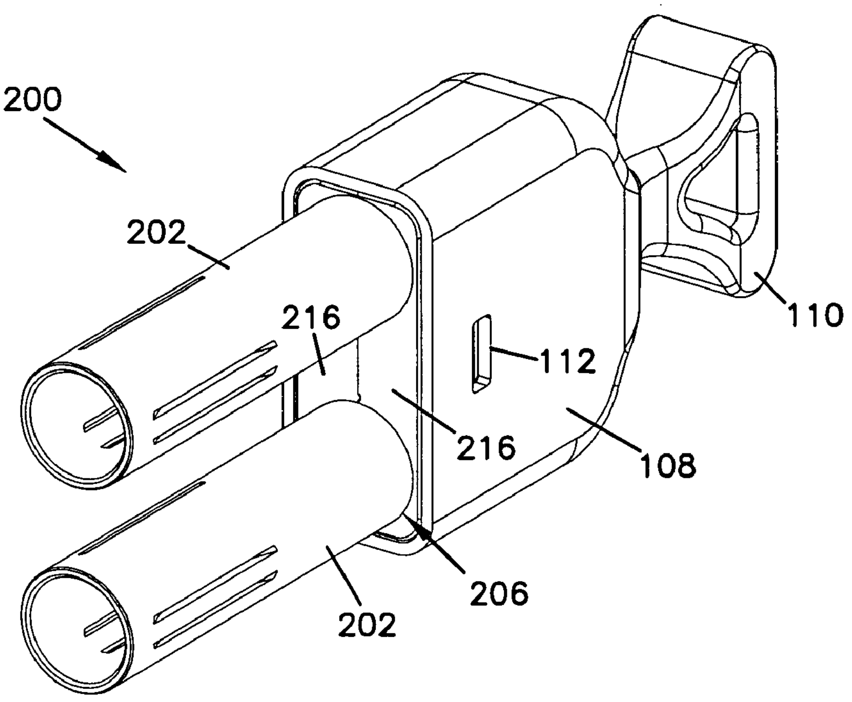
FIG. 8 is a first perspective view of a second embodiment of a loop plug for connecting pairs of jacks such as mounted to the connection panel of FIG. 1.
Figure 9:
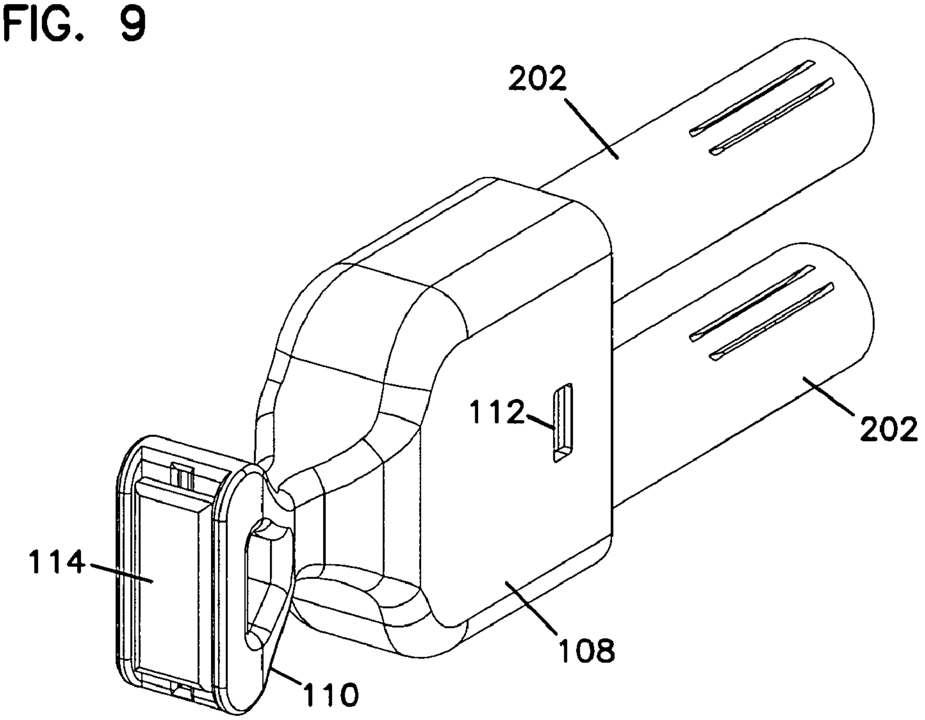
FIG. 9 is a second perspective view of the loop plug of FIG. 8.
Figure 10:
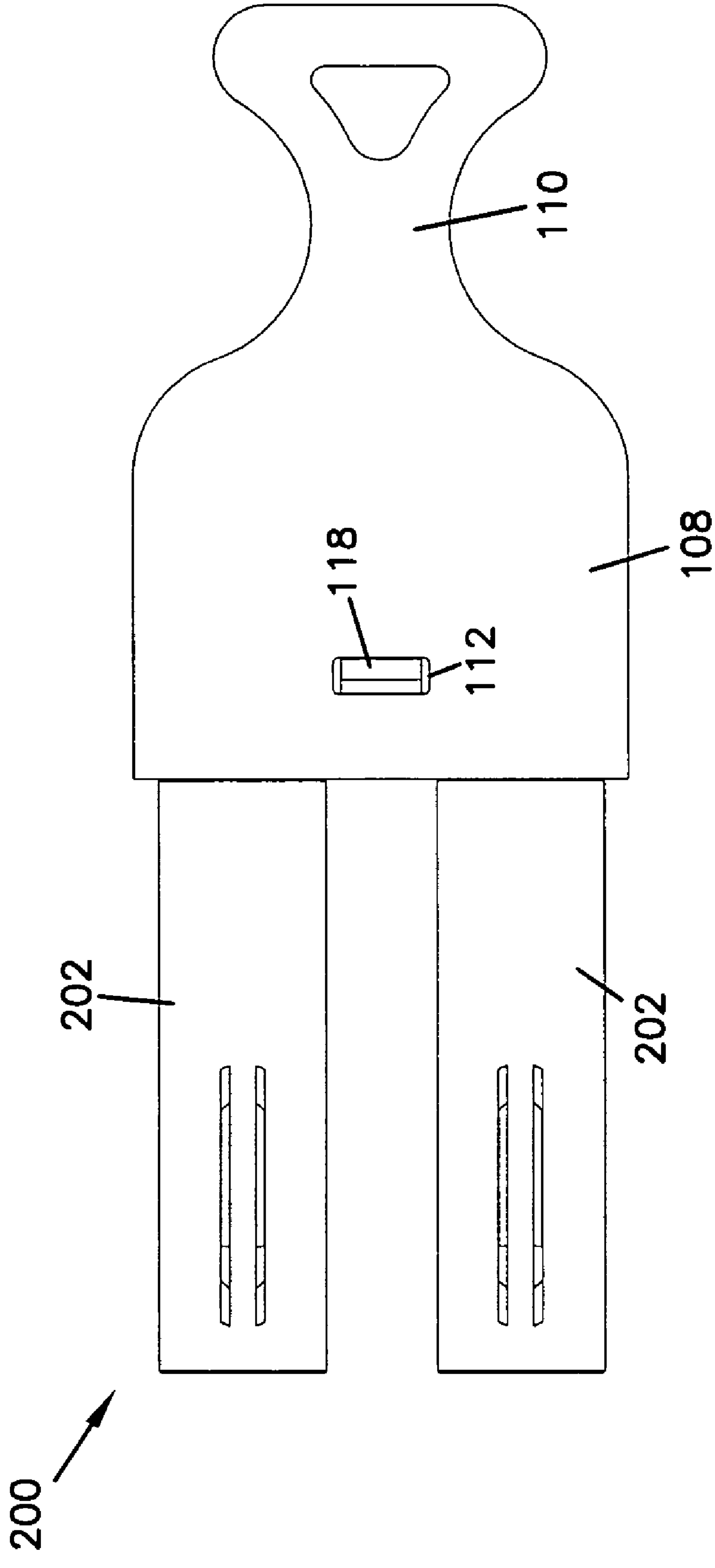
FIG. 10 is a side view of the loop plug of FIG. 8.
Figure 12:
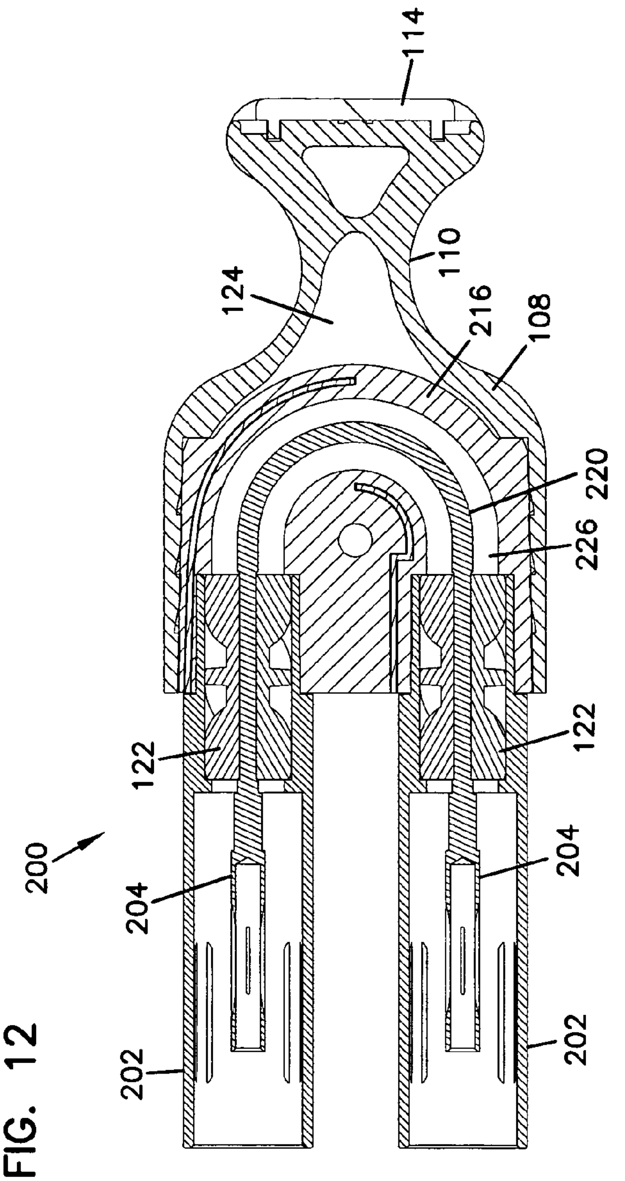
FIG. 12 is a side cross-sectional view of the loop plug of FIG. 8.
Figure 11:
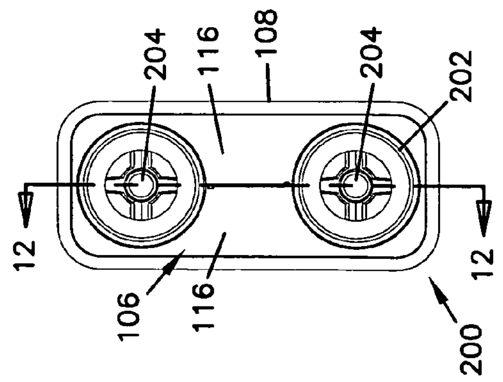
FIG. 11 is an end view of the loop plug of FIG. 8.
Figure 13:
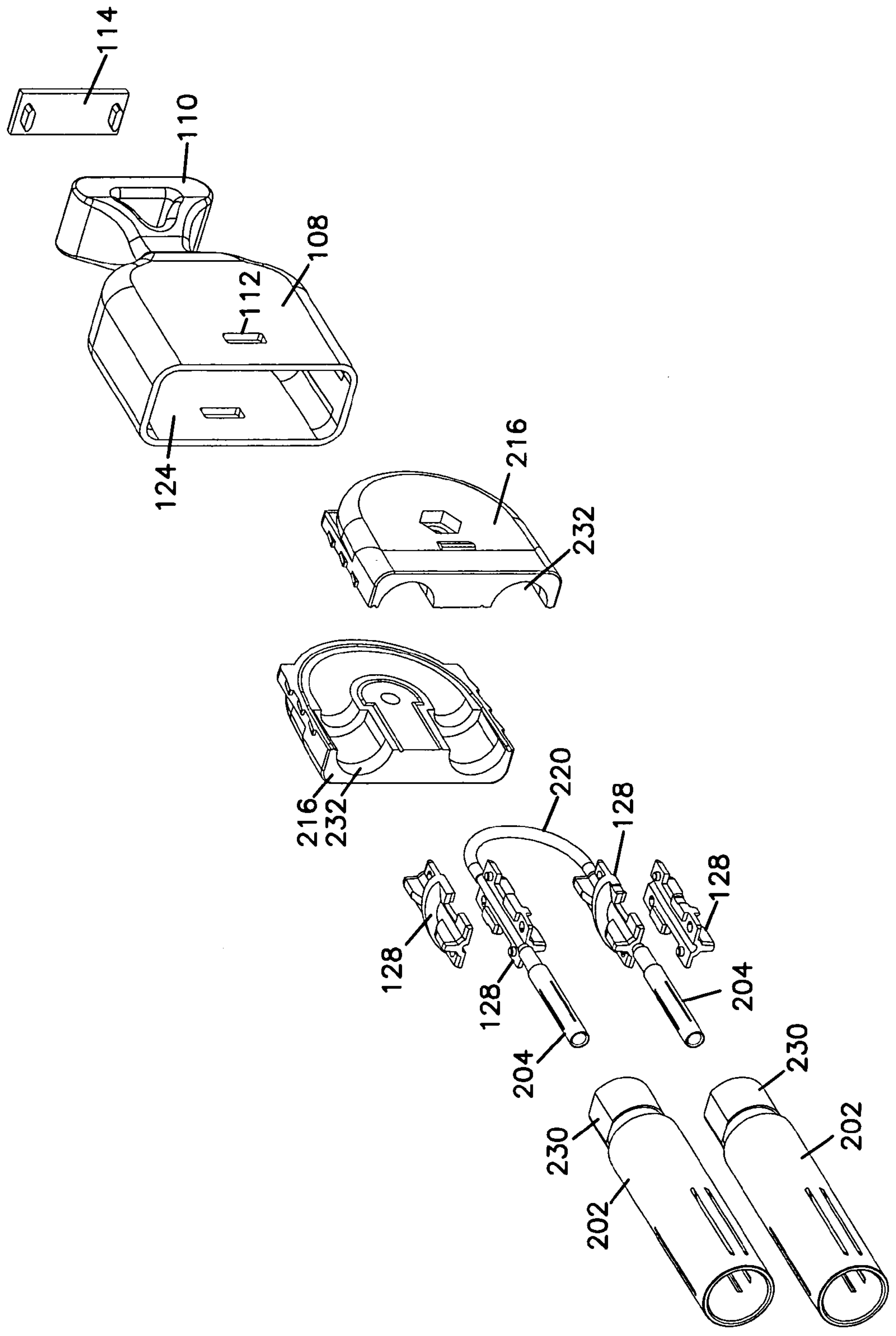
FIG. 13 is an exploded perspective view of the loop plug of FIG. 8.
Figure 14:
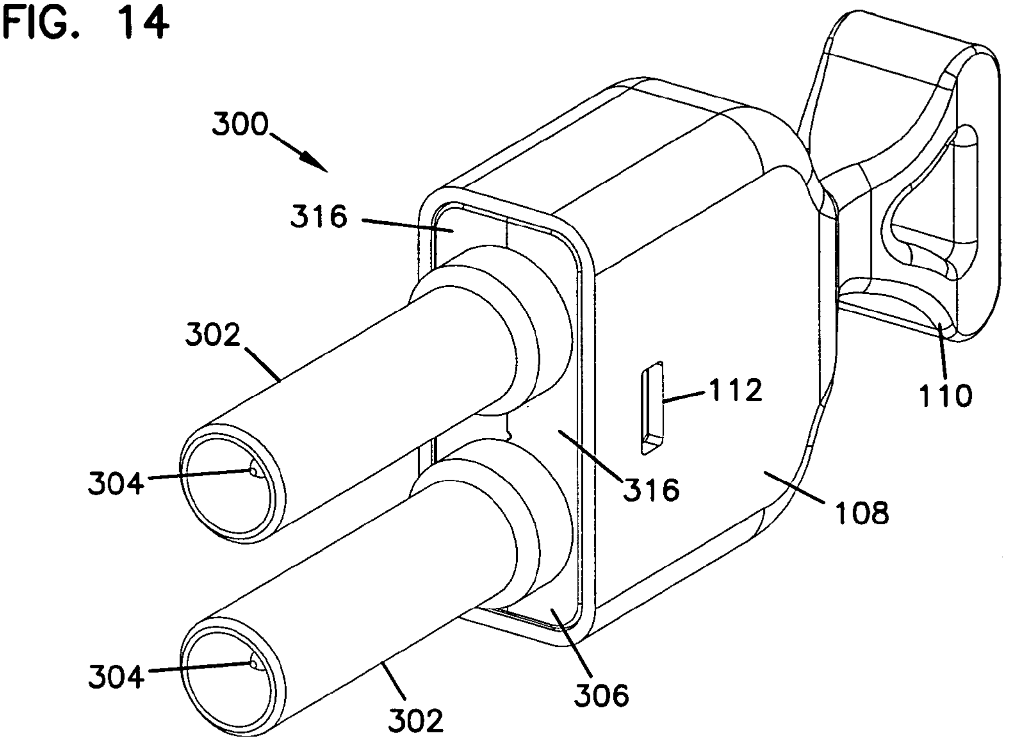
FIG. 14 is a first perspective view of a third embodiment of a loop plug for connecting pairs of jacks such as mounted to the connection panel of FIG. 1.
Figure 15:
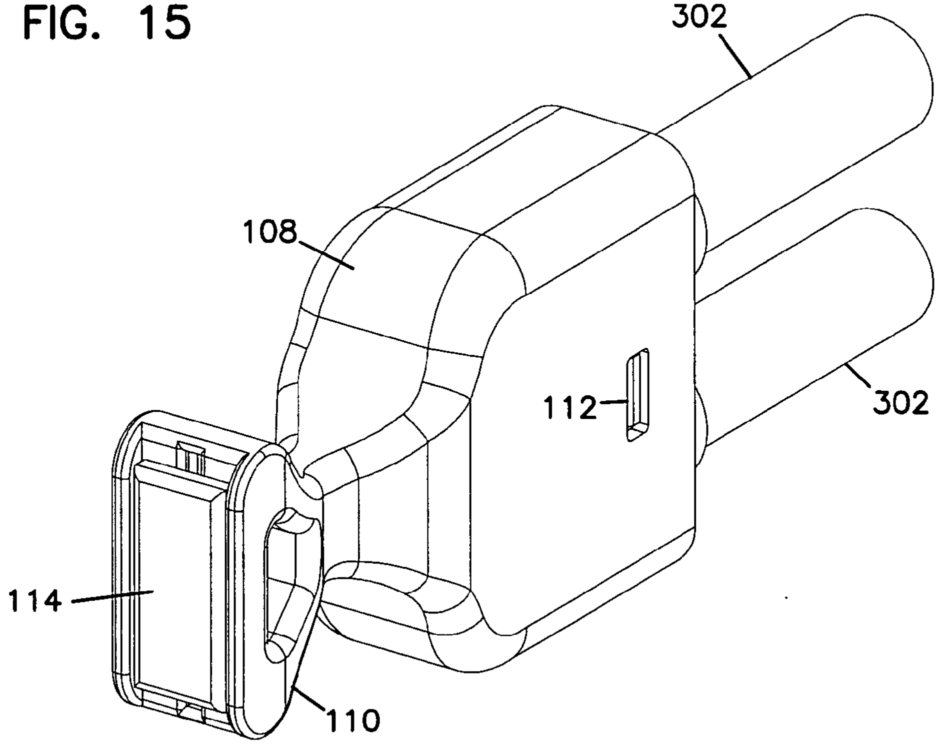
FIG. 15 is a second perspective view of the loop plug of FIG. 14.
Figure 16:
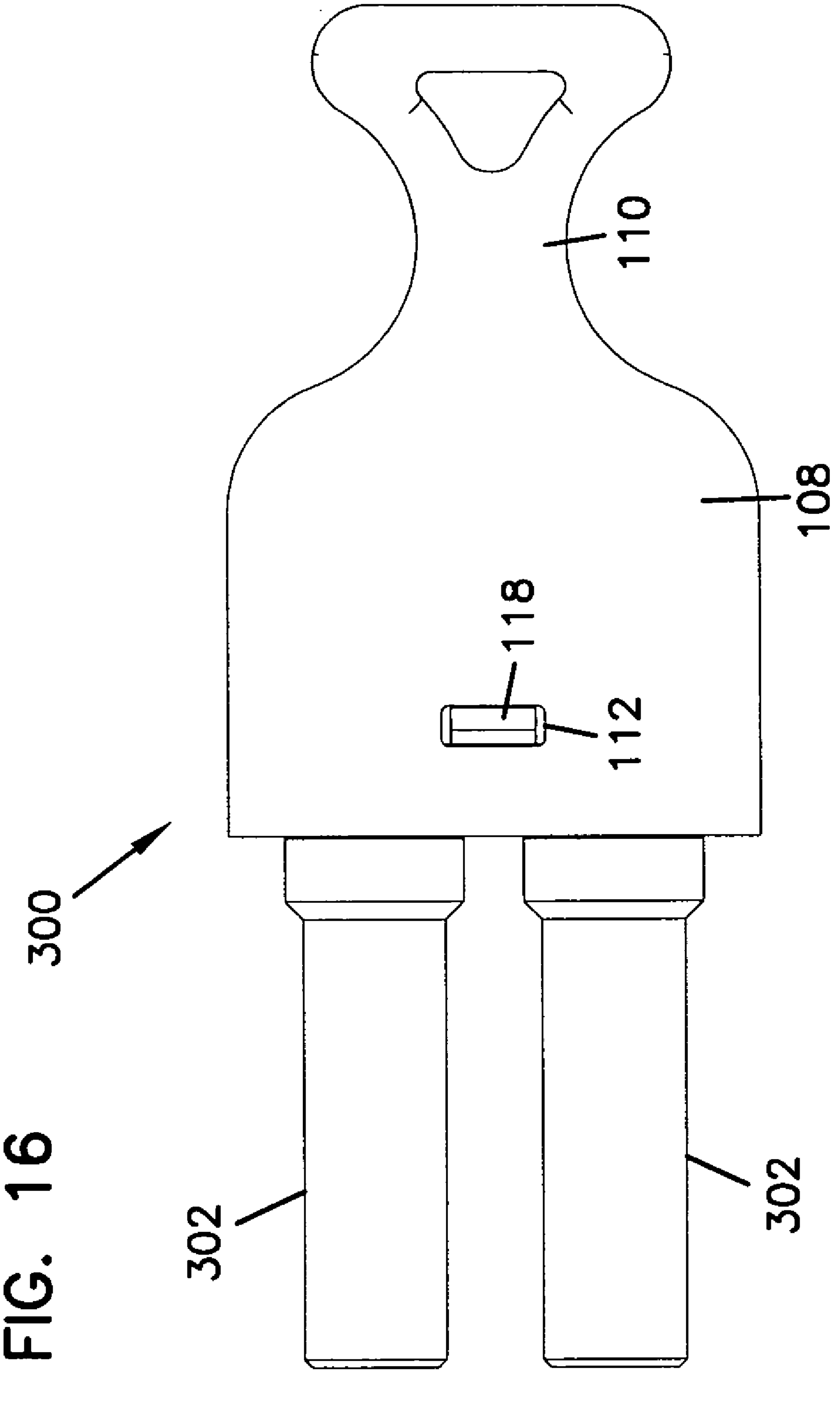
FIG. 16 is a side view of the loop plug of FIG. 14.
Figure 18:
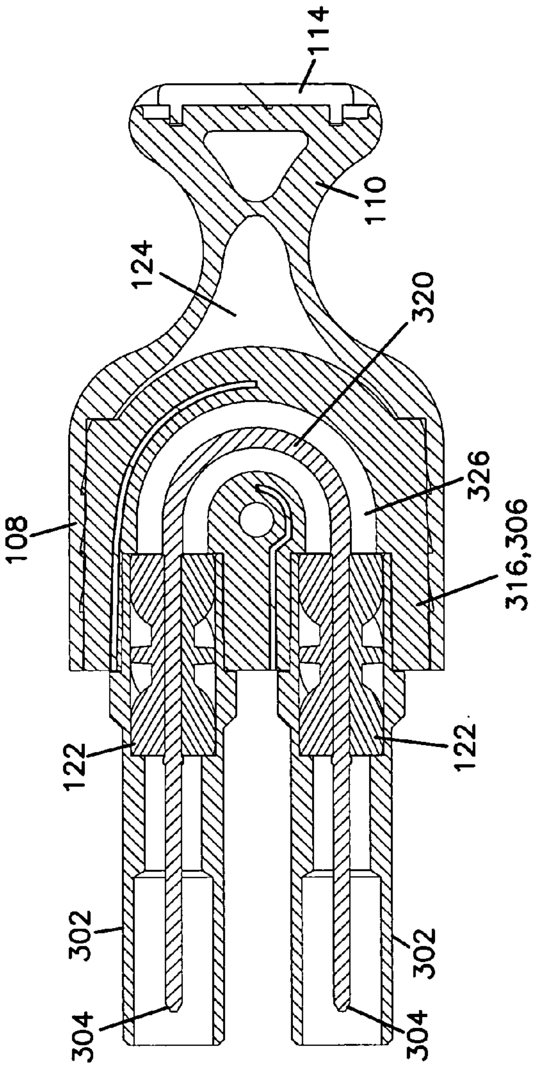
FIG. 18 is a side cross-sectional view of the loop plug of FIG. 14.
Figure 17:
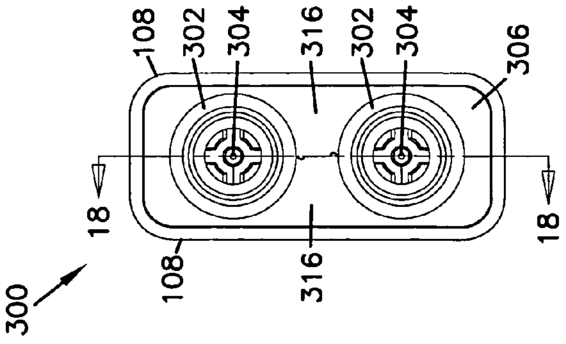
FIG. 17 is an end view of the loop plug of FIG. 14.
Figure 19:
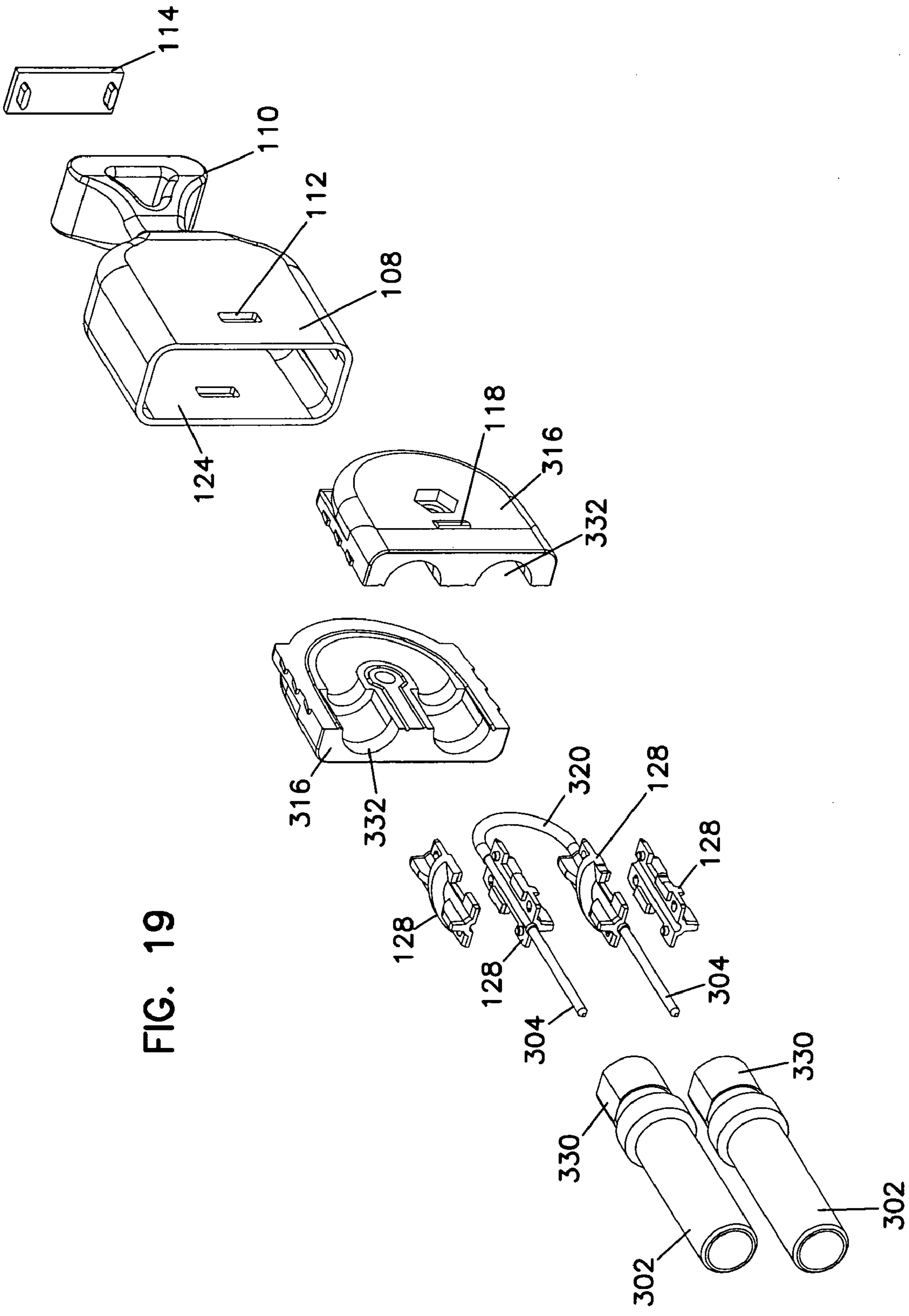
FIG. 19 is an exploded perspective view of the loop plug of FIG. 14.
Figure 20:
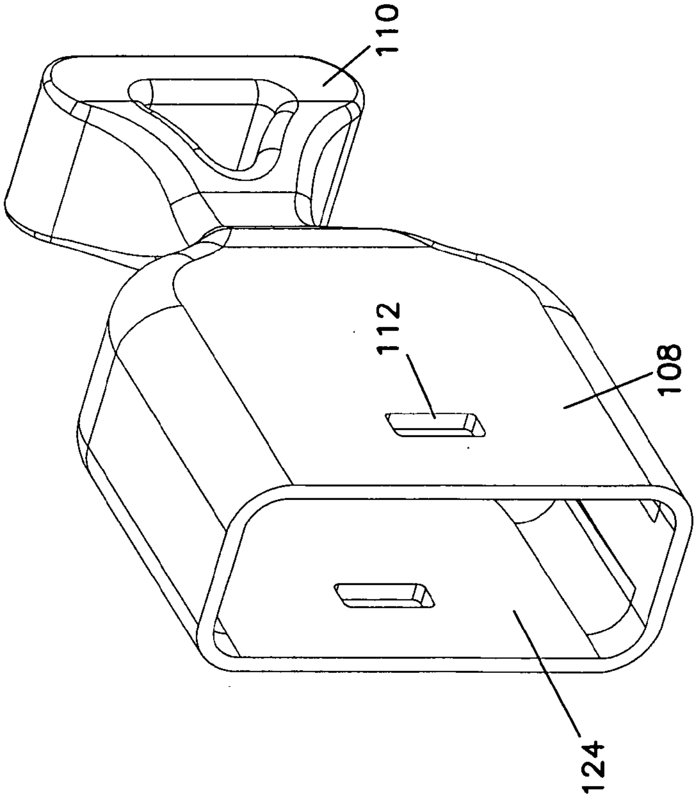
FIG. 20 is a first perspective view of an outer shell for use with any of the embodiments of loop plugs shown in FIGS. 2 to 19.
Figure 21:
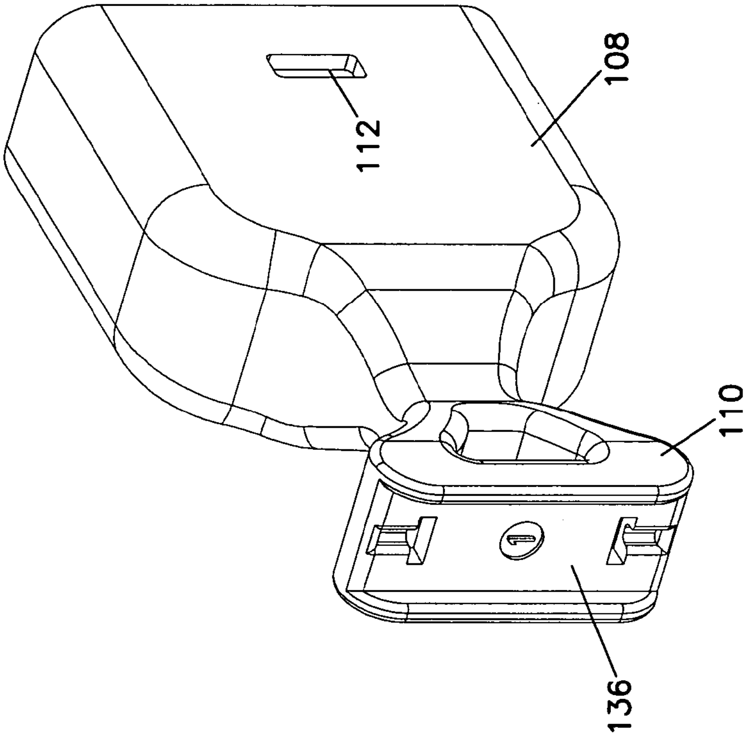
FIG. 21 is a second perspective view of the outer shell of FIG. 20.
Figure 23:
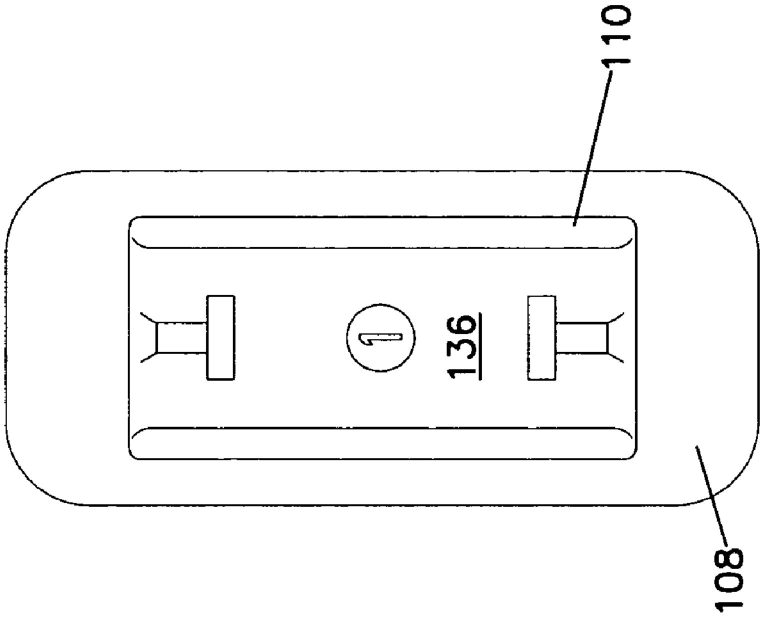
FIG. 23 is a second end view of the outer shell of FIG. 20.
Figure 22:
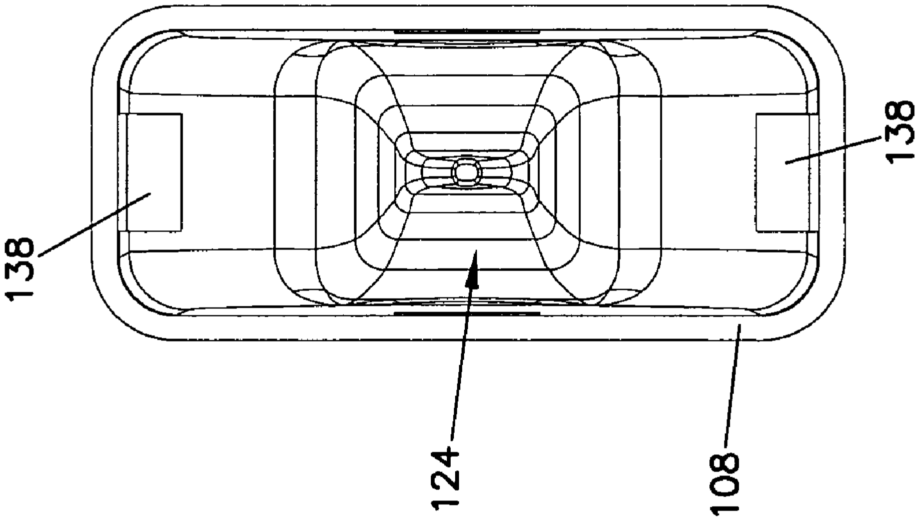
FIG. 22 is a first end view of the outer shell of FIG. 20.
Figure 24:
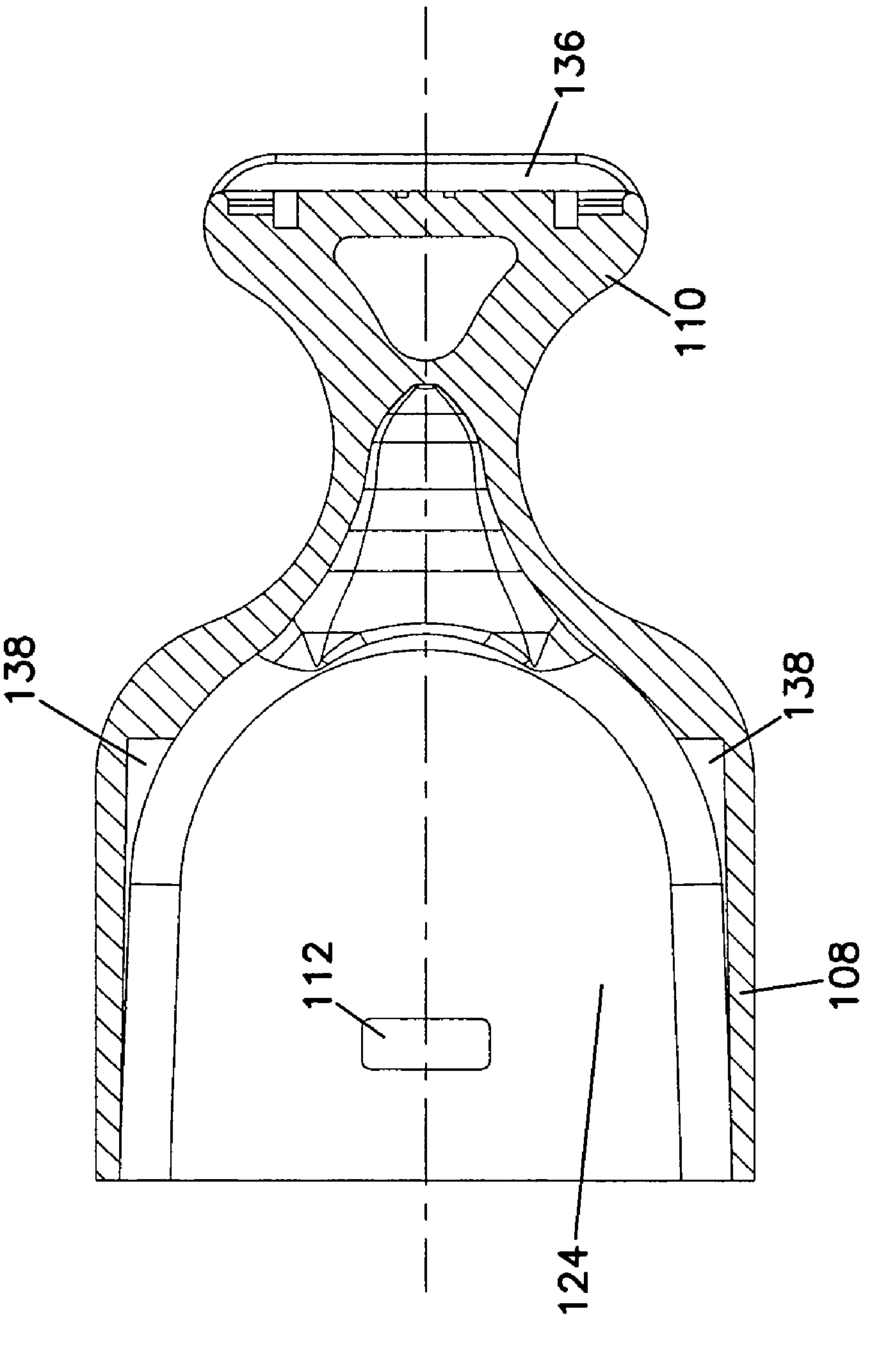
FIG. 24 is a side cross-sectional view of the outer shell of FIG. 20.
Figure 25:
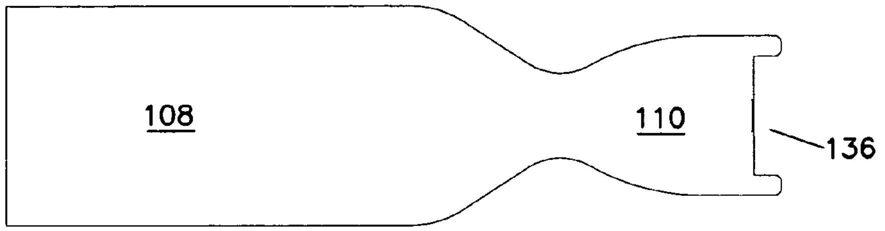
FIG. 25 is a top view of the outer shell of FIG. 20.
Figure 26:
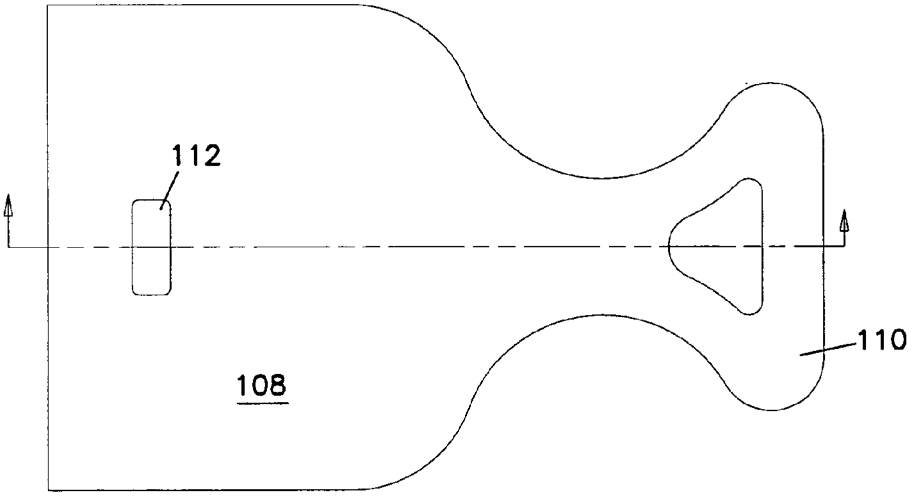
FIG. 26 is a side view of the outer shell of FIG. 20.
Figure 27:
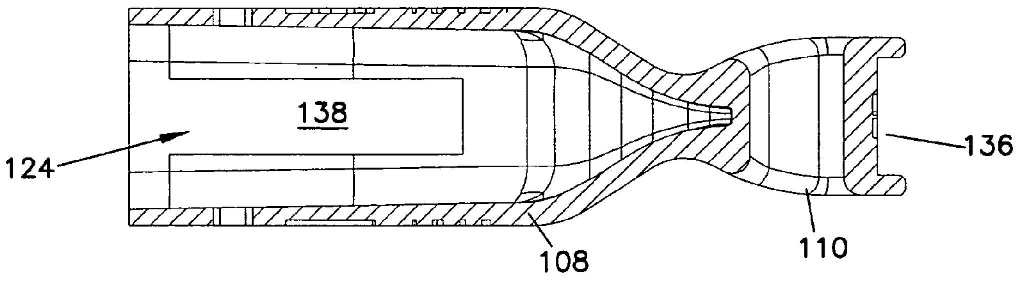
FIG. 27 is a top cross-sectional view of the outer shell of FIG. 20.
Figure 29:
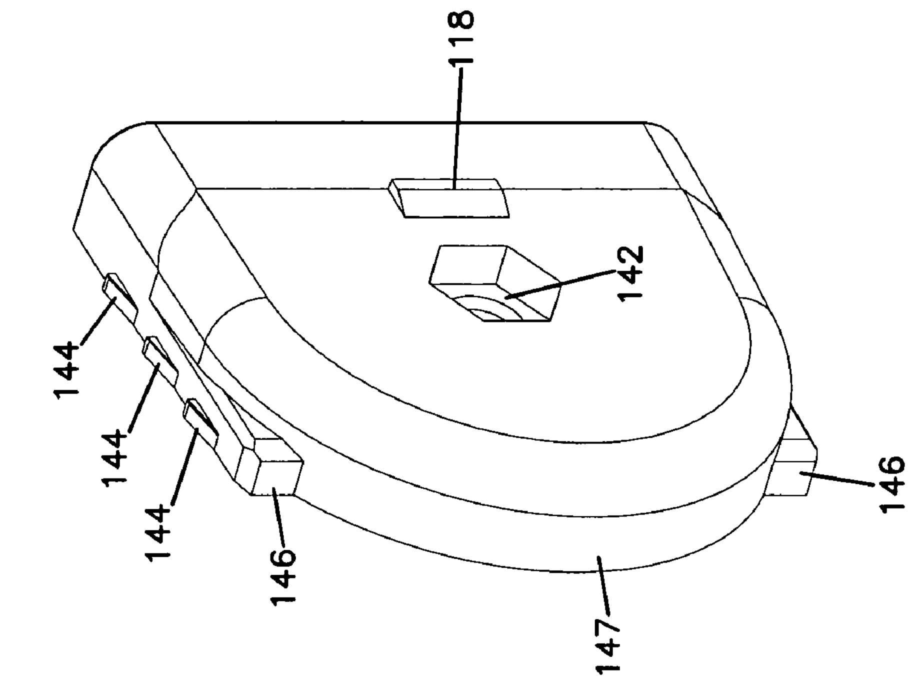
FIG. 29 is a second perspective view of the body half of FIG. 28.
Figure 28:
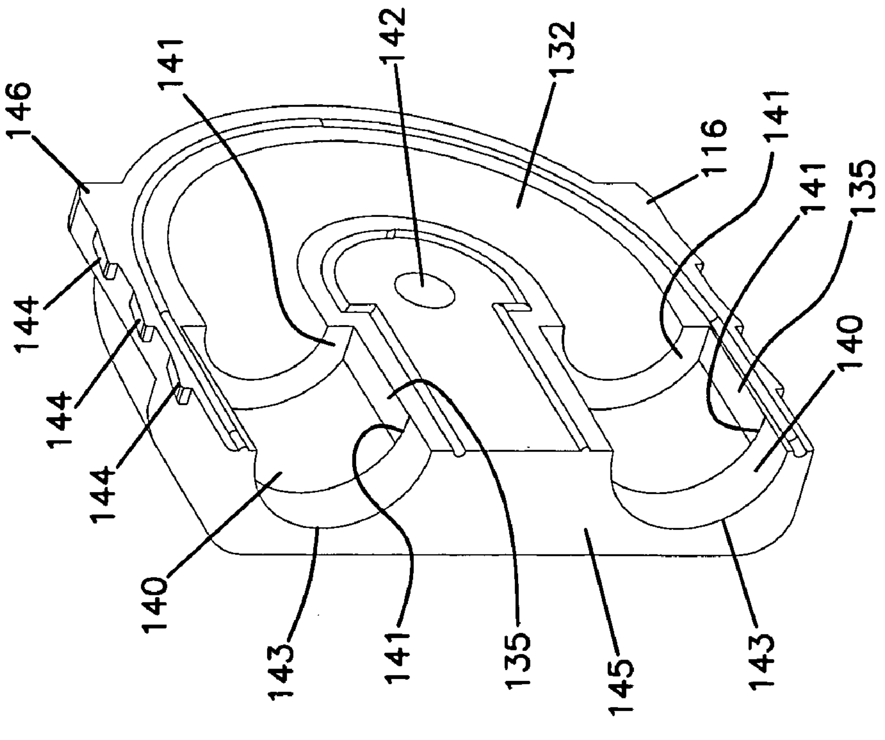
FIG. 28 is a first perspective view of a body half for use with any of the embodiments of loop plugs shown in FIGS. 2 to 7.
Figure 31:
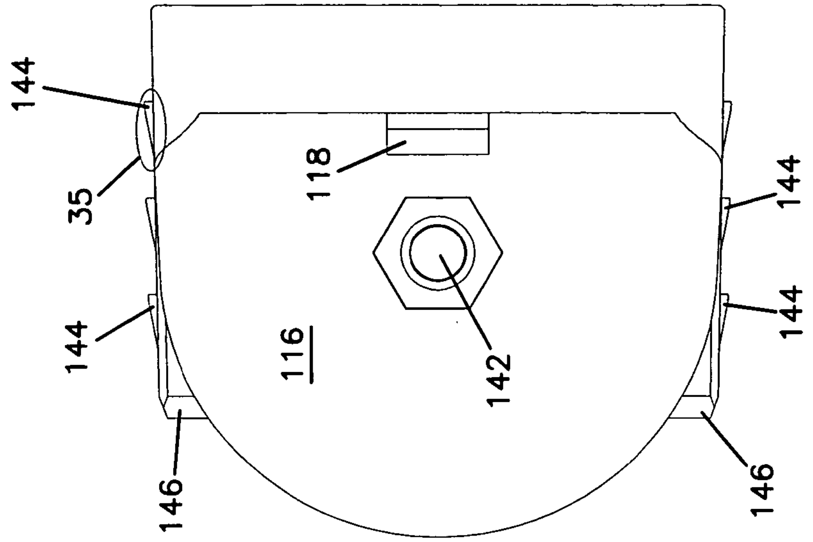
FIG. 31 is a second side view of the body half of FIG. 28.
Figure 30:
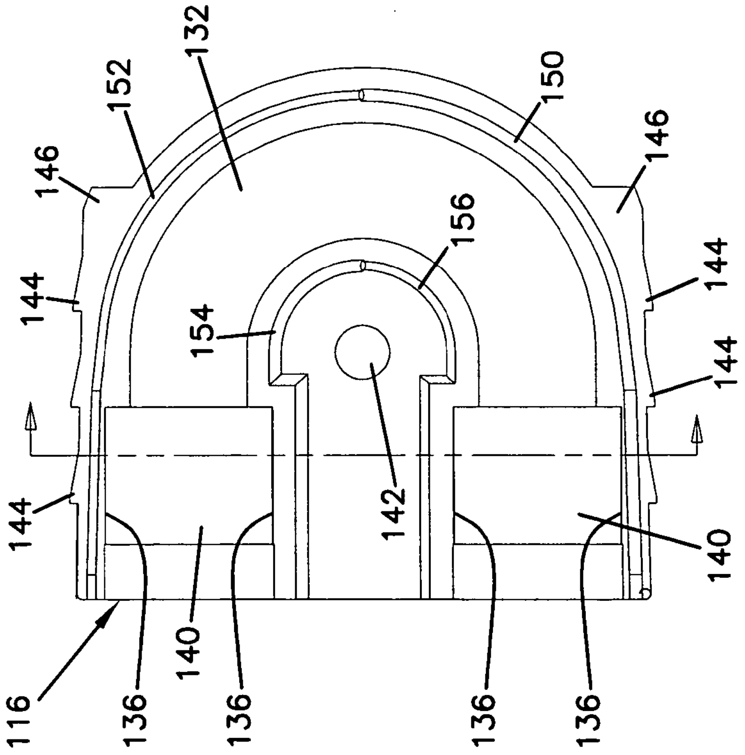
FIG. 30 is a first side view of the body half of FIG. 28.
Figure 33:
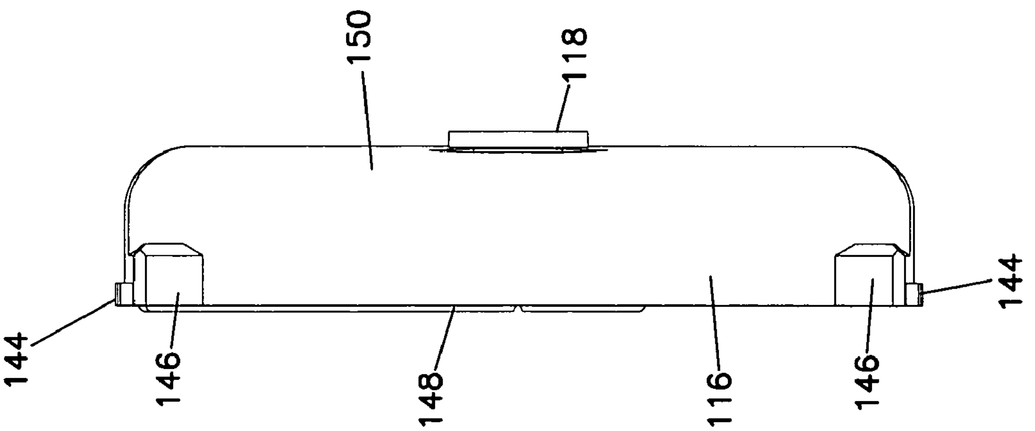
FIG. 33 is a second end view of the body half of FIG. 28.
Figure 32:
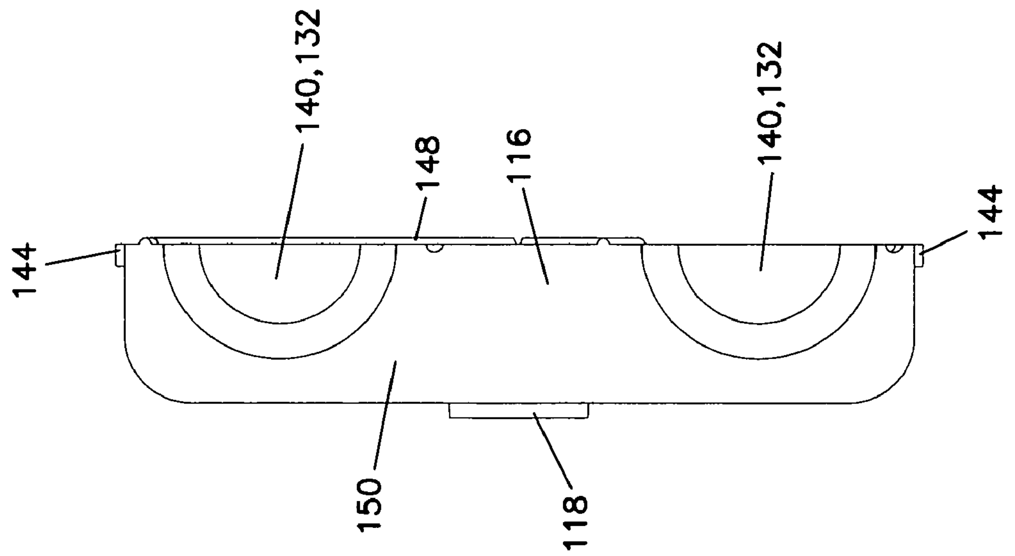
FIG. 32 is a first end view of the body half of FIG. 28.
Figure 35:
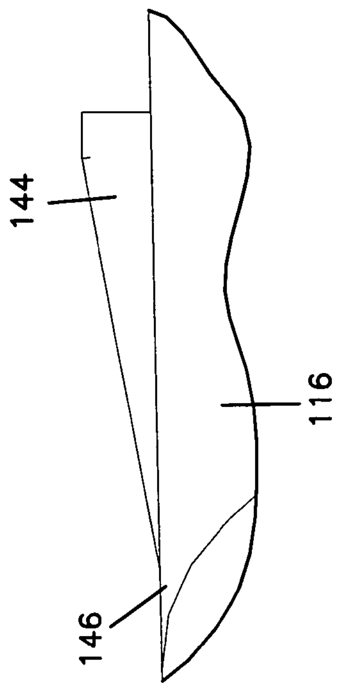
FIG. 35 is a closer view of a portion of the body half of FIG. 31, indicated by the oval labeled 35.
Figure 36:
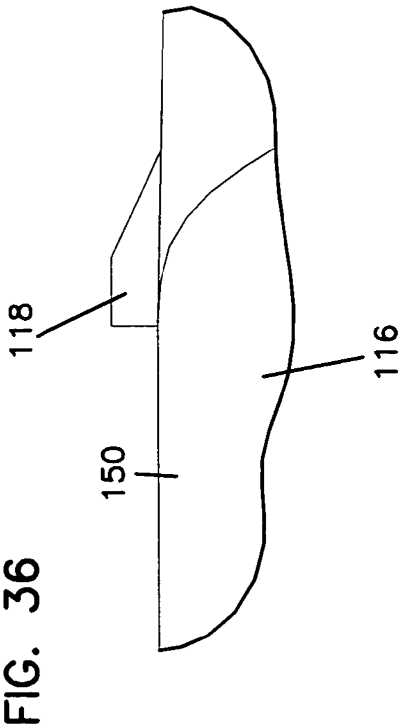
FIG. 36 is a closer view of a portion of the body half of FIG. 34, indicated by the oval labeled 36.
Figure 34:
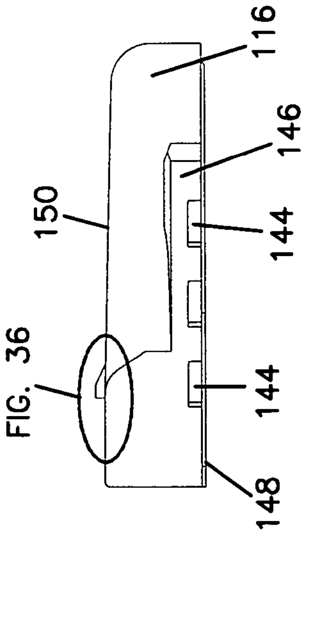
FIG. 34 is a top view of the body half of FIG. 28.

Referring now to FIGS. 6 and 7, barrels 102 each include a mating end 130 which is engaged by opening 126. Opening 126 is defined by recess 132 on an inner face of each inner housing halves 116. Insulators 122 may be formed from two identical pieces or halves 128.

FIGS. 8 to 13 illustrate a second embodiment 200 of loop plug. Loop plug 200 is generally configured the same as loop plug 100, with the exception of barrels 202, which are configured to mate with a different type, shape or format of front ends 16 of jacks 12. There are a variety of common standard sizes and formats for front ends 16, including standard jacks, mini jacks, mid-size jacks, or MUSA jacks. The different loop plugs illustrated herein are configured to mate with different format and size front ends 16. While referred to as loop plugs, it is understood that some embodiments may not conform to consistent gender definitions but are configured to mate with the outer barrel and center conductor of whatever front end is presented through openings 20 in front face 18.

Loop plug 200 also includes a second embodiment of inner housing 206 and housing halves 216. Housing 206 is sized to receive barrels 202, which may have mating ends 230 which are sized different from mating ends 130 of barrels 102. Further, barrels 202 may be spaced differently to mate with a different size, or format jack pair. A continuous loop conductor 220 includes two opposite ends 204 extending within barrels 202 and positioned and electrically isolated by insulators 122. Inner housing 206 defines an inner opening 226 for receiving loop conductor 220. Inner housing 206 is received within opening 124 of outer housing 108 and inner housing 206 includes opposing tab portions 118 which are received within openings 112.

Referring now to FIGS. 14 to 19, a third embodiment 300 of a loop plug is illustrated. Loop plug 300 includes a pair of barrels 302 and center conductors 304 within barrels 302 for engaging and mating with front ends 16 of jack pairs 14. As discussed above, barrels 302 are sized and spaced apart for mating with different size, style or format front ends 16. An inner housing 306 including a pair of halves 316 hold barrels 302. A continuous loop conductor 320 with opposite ends 304 is mounted within an opening 326 of inner housing 306 and inner housing 306 is mounted within opening 124 of outer housing 108. Halves 316 includes recesses 332 which cooperate to define opening 326 which also receives a mating end 330 of each barrel 302.

FIGS. 20 to 27 illustrate outer housing 108, which is preferably molded or otherwise formed of a softer insulative material, such as plastic. Grip portion 110 includes a recess 136 for receiving indicia 114. See FIGS. 3, 6 and 7, for example. Indicia 114 can be a color coded plastic plate which snaps into place. A channel 138 is formed along the top and bottom of opening 124.

Figure 37:
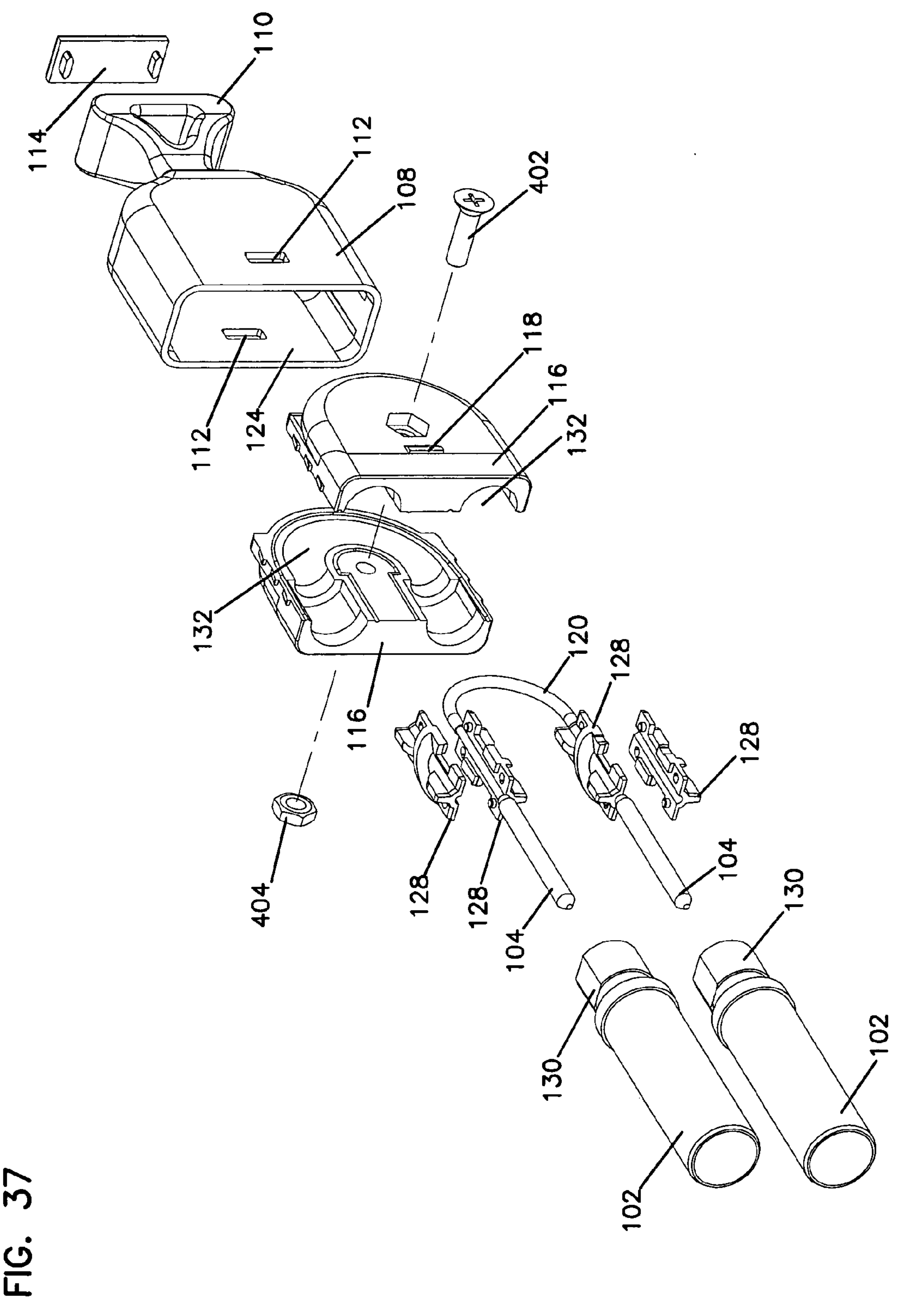
FIG. 37 is a view like FIG. 7 showing a fastening system for holding the body halves together.

FIGS. 28 to 36 illustrate inner housing halve 116. Recess 132 includes a mating end 140 defining an opening 143 sized to receive and engage mating end 130 of barrel 102. An opening 142 is positioned centrally between a curve of recess 132. While opening 142 may be used to insert a fastener to hold inner housing 106 together, outer housing 108 is sized to negate the need for any fasteners for inner housing 106. FIG. 37 shows a fastener system for holding housing valves 116 together including a screw 402 and a nut 404.

Housing halves 116 are preferably die cast of a conductive metallic material which will electrically connect barrels 102. By positioning opening 142 centrally within housing halve 116, the uniformity of wall thickness created by the casting process can be improved. Each housing halve 116 includes tab portion 118. A rib 146 extends from a each of a top and a bottom edge of housing halve 116 and is received within channel 138 of opening 124 of outer housing 108. A plurality of ramped ridges 144 may be positioned atop each of the ribs 146 to aid tab portion 118 in engaging outer housing 108 and holding inner housing 106 within opening 124.

Each housing halve 116 includes an inner face 148 which engages the inner face 148 of another housing halve 116 to form inner housing 106. An outer face 150 opposite inner face 148 includes tab portion 118. On inner face 148 of housing halve 116 adjacent an outer edge of recess 132 are a mating outer groove 150 and ridge 152 which mate which each other when two halves 116 are positioned to form inner housing 116. Similarly, an inner groove 154 and ridge 156 are positioned adjacent an inner edge of recess 132. These grooves and ridges cooperate to form interface features about opening 126 of inner housing 116. Rear face 147 is generally rounded and follows the shape of recess 132.

Housing halves 116 and barrels 102 include a mating interface which keeps barrels 102 secured to housing halves 116. Housing halves 116 include flats 135 which mate with corresponding flats 137 on mating ends 130 of barrels 102. The mating interface prevents rotation of barrels 102. Shoulders 141 on housing halves keep barrels 102 from moving axially. Once mated, barrels 102 project outward from openings 143 in front face 145.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A loop plug comprising:

a conductive housing including first and second halves which together form a loop back passage through the housing extending between first and second openings on a front face of the housing;

a center conductor having a U-shaped positioned in the loop back passage and including first and second ends extending from the first and second openings, respectively;

an insulator around at least a portion of the center conductor;

first and second conductive barrels mounted to the housing and in conductive contact with the housing, each of the first and second conductive barrels mounted around one of the first and second ends of the center conductor, respectively, each of the first and second conductive barrels extending parallel to each other from the first and second openings of the housing, the insulator separating the center conductor from contact with the first and second conductive barrels;

a non-conductive handle mounted to the housing.

2. The loop plug of claim 1, wherein the handle snaps to the housing.

3. The loop plug of claim 1, wherein the first and second halves of the housing are identical.

4. The loop plug of claim 1, wherein each half of the housing has a groove portion and a ridge portion, the groove and ridge portions of one half of the housing interlocking with respective ridge and groove portions of the other half of the housing.

5. The loop plug of claim 1, wherein a rear face of the housing includes a rounded exterior face facing in an opposite direction to the front face.

6. The loop plug of claim 1, wherein the handle has a first major dimension parallel to an axis extending between the first and second openings, wherein the handle has a necked portion smaller than the first major dimension, wherein the handle has a distal portion having a dimension greater than the necked portion.

7. The loop plug of claim 1, wherein the handle defines a pocket for receiving the housing, wherein the handle defines a plurality of openings, wherein the housing defines a plurality of protrusions, each protrusion received in one of the openings.

8. The loop plug of claim 1, wherein the handle includes a plug-in indicia member at a rear face of the end opposite the front face of the housing.

9. The loop plug of claim 1, wherein a mounting arrangement between the conductive barrels and the housing includes flats on the housing and the barrels, and a shoulder on the housing, wherein rotation of the barrels and axial movement of the barrels are prevented.

10. The loop plug of claim 1, wherein the handle defines a pocket which surrounds the housing on four sides adjacent to a rear face of the housing.

11. The loop plug of claim 10, wherein the housing is completely surrounded by the handle except for the front face.

12. The loop plug of claim 1, wherein the first and second halves of the housing are received in a pocket of the handle and are held within the pocket by snaps.

13. The loop plug of claim 12, wherein each of the first and second halves have an open hole through a center region in a direction transverse to a plane defined by the center conductor.

14. The loop plug of claim 1, wherein the insulator includes two insulator members, each insulator member mounted about the center conductor within each of the first and second conductive barrels.

15. The loop plug of claim 14, wherein each insulator member includes identical halves mounted to each other on opposite sides of the center conductor.

16. A loop plug comprising:

a conductive housing including first and second identical halves which together form a loop back passage through the housing extending between first and second openings on a front face of the housing;

a center conductor having a U-shaped positioned in the loop back passage and including first and second ends extending from the first and second openings, respectively;

an insulator around at least a portion of the center conductor;

separate first and second conductive barrels mounted to the housing and in conductive contact with the housing, each of the first and second conductive barrels mounted around one of the first and second ends of the center conductor, respectively, each of the first and second conductive barrels extending parallel to each other from the first and second openings of the housing, the insulator separating the center conductor from contact with the first and second conductive barrels;

a non-conductive handle mounted to the housing, wherein the first and second halves of the housing are snapped into a pocket defined by the handle.

17. The loop plug of claim 16, wherein the housing is completely surrounded by the handle except for the front face.

18. The loop plug of claim 16, wherein each half of the housing has a groove portion and a ridge portion, the groove and ridge portions of one half of the housing interlocking with respective ridge and groove portions of the other half of the housing.

19. The loop plug of claim 16, wherein each of the first and second halves have an open hole through a center region in a direction transverse to a plane defined by the center conductor.

20. The loop plug of claim 16, wherein a rear face of the housing includes a rounded exterior face facing in an opposite direction to the front face.

21. The loop plug of claim 16, wherein the handle has a first major dimension parallel to an axis extending between the first and second openings, wherein the handle has a necked portion smaller than the first major dimension, wherein the handle has a distal portion having a dimension greater than the necked portion.

22. The loop plug of claim 16, wherein the handle defines a pocket for receiving the housing, wherein the handle defines a plurality of openings, wherein the housing defines a plurality of protrusions, each protrusion received in one of the openings.

23. The loop plug of claim 16, wherein the handle includes a plug-in indicia member at a rear face of the end opposite the front face of the housing.

24. The loop plug of claim 16, wherein a mounting arrangement between the conductive barrels and the housing includes flats on the housing and the barrels, and a shoulder on the housing, wherein rotation of the barrels and axial movement of the barrels are prevented.

25. The loop plug of claim 16, wherein the insulator includes two insulator members, each insulator member mounted about the center conductor within each of the first and second conductive barrels.

26. The loop plug of claim 25, wherein each insulator member includes identical halves mounted to each other on opposite sides of the center conductor.

* * * * *